United States Patent [19]

Muskovac et al.

[11] Patent Number: 4,727,305
[45] Date of Patent: Feb. 23, 1988

[54] MULTI-FUNCTION CONTROL SYSTEM FOR AN INDUCTION MOTOR DRIVE

[75] Inventors: Nicholas G. Muskovac, Palm Harbor, Fla.; Kenneth E. Daggett, Murrysville, Pa.

[73] Assignee: Westinghouse Electric Corp., Pittsburgh, Pa.

[21] Appl. No.: 858,132

[22] Filed: Apr. 30, 1986

[51] Int. Cl.$^4$ .............................................. H02P 5/40
[52] U.S. Cl. ..................... 318/798; 318/452; 318/806
[58] Field of Search ....................... 318/452, 798, 806

[56] References Cited

U.S. PATENT DOCUMENTS

| 3,119,055 | 1/1964 | Martin | 318/452 |
| 4,384,243 | 5/1983 | Muskovac | 318/729 |
| 4,419,615 | 12/1983 | Muto et al. | 318/811 |
| 4,482,852 | 11/1984 | Muskovac | 318/729 |
| 4,482,853 | 11/1984 | Bhausar | 318/778 |
| 4,623,967 | 11/1986 | Naimer | 361/24 |

Primary Examiner—David Smith, Jr.
Attorney, Agent, or Firm—C. M. Lorin

[57] ABSTRACT

In an induction motor drive controlled by SCR devices connected in the AC power supply phase lines of the motor, a plurality of channels establish, on a common input to a digital gate pulse generator of the SCR's, various signals occurring in the course of the motor drive operation. These signals relate to motor operating modes, such as soft start tripping, current limit. A central large scale integrated (LSI) chip responds digitally to such common input so as to establish the required firing angle at any instant and for any situation.

3 Claims, 12 Drawing Figures

MULTI-FUNCTION CONTROL SYSTEM FOR AN INDUCTION MOTOR DRIVE

CROSS-REFERENCED PATENT APPLICATION

The invention is related to U.S. Pat. No. 4,630,188 entitled "Multi-Zone Ramp System for Digital Pulse Generator and Large Sale Integrated Chip Embodying the Same". U.S. Pat. No. 4,630,188 is hereby incorporated by reference.

BACKGROUND OF THE INVENTION

The present invention relates to multi-phase AC induction motor control, in general, and more particularly to multi-mode control system for an induction motor capable of operating from idle to run speed and conversely to a stop.

Solid-state AC motor starter circuits are generally known. See for instance "Design and Application of a Solid-State AC Motor Starter" by John Mungenast in IEEE Transactions, Vol. IA-12, No. 1, 1976, pp. 39-42. Starting requirements of an induction motor have been reviewed in "Starting Requirements of Pipeline Motor" by Howard E. Barr, in IEEE Transactions, Vol. IA-15, No. 6, 1979, pp. 625-629. A most commonly used mode of starting an induction motor is by reduced-voltage. See for instance "Reduced-Voltage Starting of Squirrel-Cage Induction Motors" by Frank M. Bruce, R. J. Graefe, Arthur Lutz and M. D. Panlener, in IEEE Transactions, Vol. IA-20, No. 1, 1982, pp. 46-55.

Problems and solutions involving motor starting have been considered in U.S. Pat. Nos. 4,384,243 and 4,482,852 of Nicholas G. Muckovac. See also "Service to Induction Motor" by Archie W. Cain, in IEEE Transactions Vol. IGA-7, No. 3, 1971, pp. 359-366; and see U.S. Pat. No. 4,482,853 of M. R. Bhavaar.

The present invention involves control of an AC motor through SCR's for soft start as well as for a stop. Much of the former practice with this type of AC motor starter or motor stopper relied on analog gate pulse generators. Starting or stopping of an induction motor may go through a number of critical stages, or situations, that can occur within a very short time span. With an SCR gate pulse generator, as commonly used with a 3-phase motor, accurate timing of the SCR gate pulses is necessary, but difficult to achieve considering the many and fast response steps involved in the starting process. Also, it is not always possible to obtain zero to 100% range of control at all power factors. The motor starting or stopping procedure may involve a series of critical events between idle and normal operative speed of the motor. Among these, there is an increased, or a reduced voltage, applied to the motor during the critical period, obtained by phasing the firing angle of the SCR's far enough, which action may have to be countermanded. The starting or stopping procedure may have to be interrupted, or modified to respond to critical events encountered in the process. These events may be detected as a result of sensing the load, the slip, or the current of the motor. The object of such detections is to ensure a smooth and safe start up or stoppage, to protect the motor against an abnormal situation, such as current surges, excessive slip or torque, and there may be a need for reacting immediately to trip, or compensate. The invention applies to a situation where the only controllable unit in each such situation is the gate pulse generation system which normally establishes a predetermined motor operation, but also which commands ramping up the motor in speed for a soft start or ramping down to stop the motor. The gate pulse generator will be used to interrupt a soft start, to trip the operation and eventually to reinitiate the starting procedure. The problem lies here in providing an interface between the various channels, which are affected to the respective critical event, and the gate pulse generator of the induction motor, so that potential critical control and/or command signals which would prevail at a given instant, or in a given situation, may be individually applied and independently used for controlling the gate pulse generator of the induction motor, whereby the latter can respond adequately and fast enough during the starting procedure, or in the stopping process, upon the occurrence of any such particular critical event.

The present invention combines and integrates the functions of a plurality of control channels which are associated with the respective such potential independent and critical events in such a way that (1) any channel may override a running channel upon the occurrence of a correlated and prevailing event; and (2) the gate pulse generator can respond adequately and quickly to such intervening channel to control the SCR switches so as to establish immediately and appropriately an AC voltage for the motor as required by the situation.

SUMMARY OF THE INVENTION

The present invention relates to a multi-function AC induction motor control system and provides in this context for the necessary interface with the gate pulse generator controlling, via SCR devices, the voltage applied to the AC motor input terminals.

In accordance with the present invention, a digital pulse generator embodying a large scale integrated (LSI) chip of the type disclosed in U.S. Pat. No. 4,630,188 for "Multi-Zone Ramp System for Integrated Chip Embodying the Same" of Kenneth E. Daggett, is combined through a common input with a plurality of independent channels associated with the respective critical events expected during motor operation from idle to normal speed and conversely.

The digital pulse generator is coupled to an analog circuit for converting the magnitude of the signal present at the common input into a time interval representative thereof. It also includes a sequencer for establishing a dialogue between the common input and the digital counter inside the digital pulse generator which times the generation of gate pulses. This dialogue is effected through an analog circuit which provides for successive and immediate responses to the particular channel involved upon potential critical events.

The integration so realized between analog channels and single digital pulse generator allows by a simple combination of means to maximize the number of channels available and, therefore, to improve the overall effectiveness of the starting procedure, also at reduced cost and with fastest response to critical events.

DETAILED DESCRIPTION OF THE PREFERRED EMBODIMENT OF THE INVENTION

Figure 1:
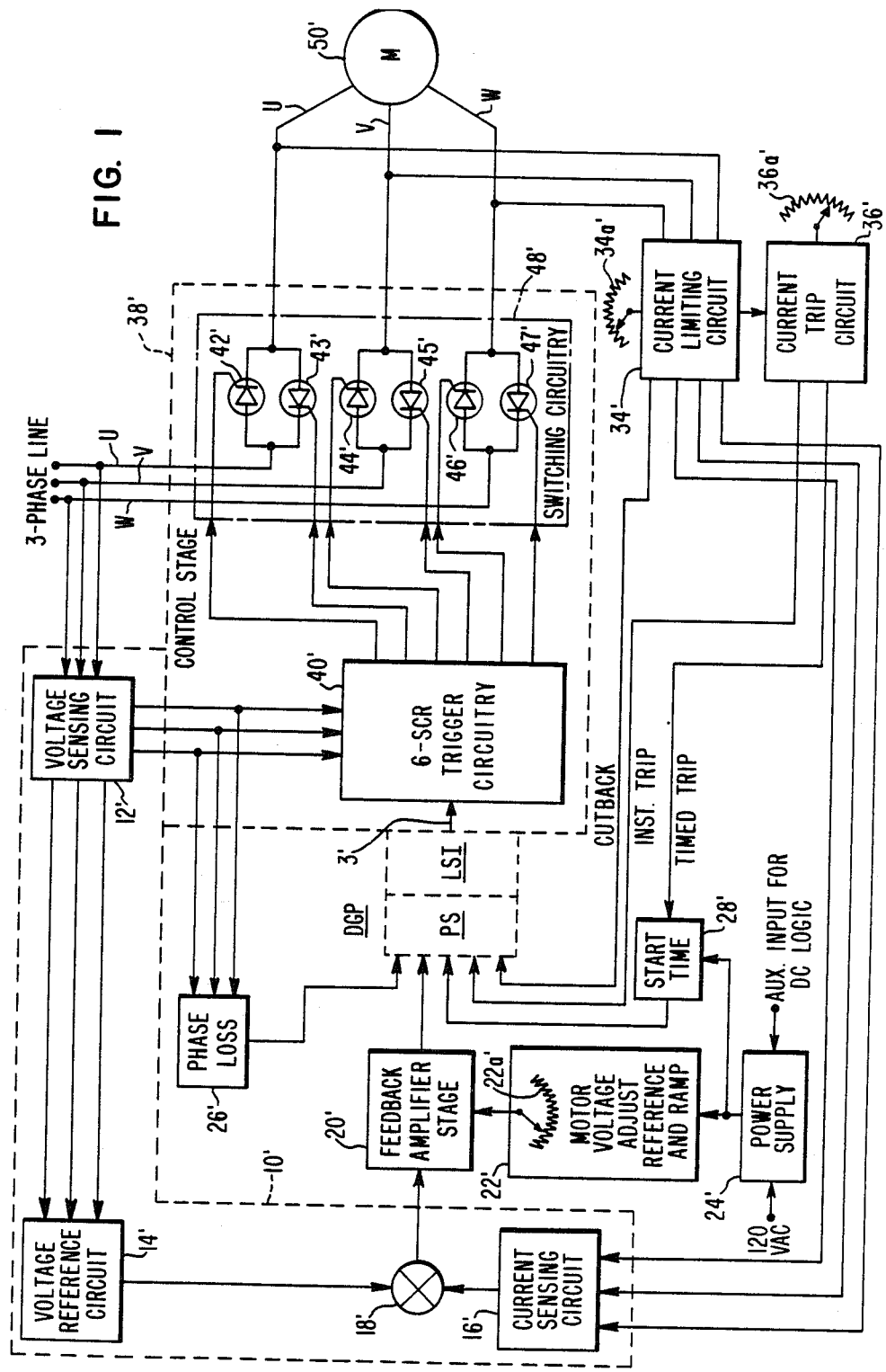
FIG. 1 is an overall view of an SCR controlled motor drive of the prior art having a starter and trip control system with associated thereto a digital pulse generator in the form of a large scale integrated (LSI) chip according to the present invention.

FIG. 1 illustrates the overall organization in the prior art of an induction motor starting system and its association with a digital pulse generator according to the invention. Illustratively, AC power is supplied to an induction motor through three phase terminals and three sets of antiparallel SCR's, one interposed in each phase line, which are controlled by a 6-SCR trigger circuit 40' as disclosed in U.S. Pat. No. 4,384,243 issued May 17, 1983. The patent shows a motor controller for controlling the voltage applied to the motor by controlling the firing angle of the SCR's, so as to provide reduced-voltage starting, as typically shown by motor voltage adjust reference circuit 22' and its ramp circuit. It also includes an "overload trip" protection provided by current limiting circuit 34' and a current trip circuit 36', which trigger an instantaneous tripping action, as well as a timed tripping action (the latter via delay 28').

Figure 2:
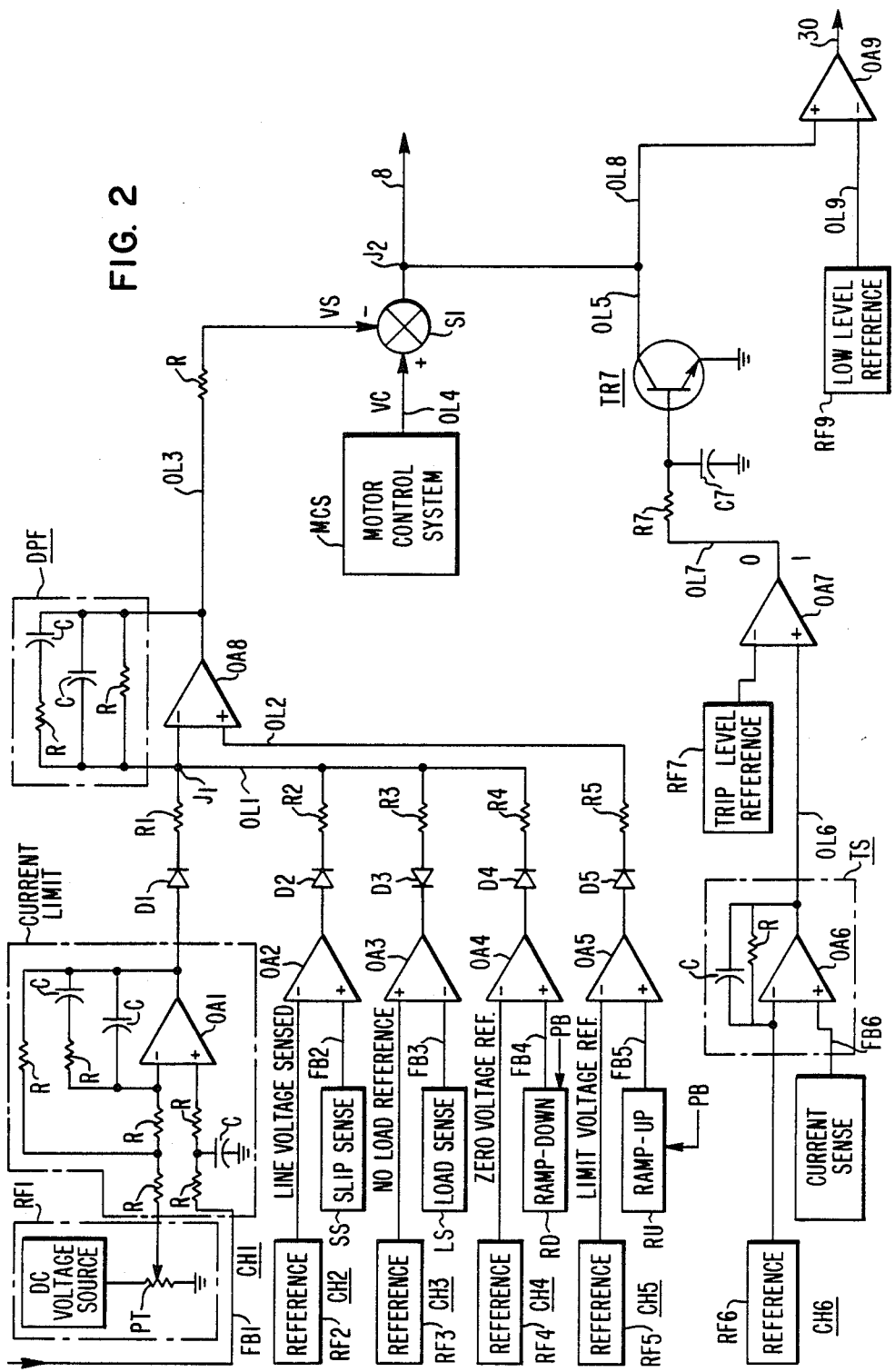
FIG. 2 shows in block diagram the multi-channel input section of the motor control system according to the present invention, which is to be combined and interfaced with the digital pulse generator LSI chip of FIG. 1.

In accordance with the present invention, a motor control input section, disclosed specifically and illustratively hereinafter by reference to FIG. 2, is associated with a digital gating pulse control circuit DGP having interfaced to one another (1) an analog to digital conversion section ANC and (2) a solid state digital data processing section incorporated within a large integrated circuit (LSI) chip.

The analog to digital conversion section ANC and the LSI have been disclosed in part in incorporated by reference U.S. Pat. No. 4,630,188 of Kenneth E. Daggett. As explained, hereinafter, circuitry in the LSI is associated with the analog section ANC to create an interface therebetween and for providing a digital response to any of the critical events causing a characteristic signal to appear at the common input to the analog section ANC, thereby to determine the generation of gating pulse as required by the motor control procedure.

FIG. 2 shows the input section IS which provides the afore-stated common input to the analog section ANC. On line 8 at the output of the input section appears a reference signal which is used as the common input signal to the analog section ANC of FIG. 3. The reference signal of line 8 is derived from a junction J2 which centralizes the outputs from several parallel channels CH1-CH5, each responding to its own reference and running signal, via a comparator providing an error signal. If the load is low, the channel will call for a reduction of the voltage.

Channel #1 (CH1) is responding to a feedback signal derived on line FB1 and representing the motor current as sensed. A current limit circuit associated with an operational amplifier OA1 receives, via a single pole filter (comprised of two resistors and a capacitor in derivation), the current signal of line FB1 and a reference signal derived from a reference RF1 illustratively shown adjusted by a potentiometer. The error is outputted from operational amplifier OA1 and passed, through a series network comprised of a diode D1 and a resistor R1, to a junction point J1. This channel works to protect against a current surge at any moment of the operation.

Channel CH2, similarly, has a reference circuit RF2 and a circuit SS providing a signal representative of the motor slip as sensed. Operational amplifier OA2 compares the reference which is characteristic of the line voltage and the feedback signal of line FB2 to provide a control signal through a series network (D2, R2) to junction J1. If the slip (which may be detected as positive, or negative) becomes excessive the channel will adjust the voltage in order to compensate.

Channel CH3 involves an operational amplifier AO3 used as a comparator between a circuit LS providing a feedback signal representative of the motor load as sensed and a reference signal characteristic of a no load situation is derived from RF3. The series combination of a diode D3 and a resistor R3 is applied from the output of OA3 to junction J1. This channel CH3 works under opposite polarity relative to the other channels.

Channel CH4 is affected to a ramp-down signal derived from a circuit RD and inputted by line FB4 to an operational amplifier OA4 otherwise responsive to a reference from circuit RF4 which is characteristic of a zero voltage situation. At the output of OA4 a series network (D4, R4) applies the output to junction J1. The ramp-down signal (operated manually with a push-button (PB), or by a computer) is effective to increase the amount of negative feedback provided at junction J2 and is used when the motor is to be brought to a stop.

Channel CH5 includes a ramp-up circuit RU which provides on line FB5 a positive feedback signal for junction J2. Comparator OA5 derives from the comparison between line FB5 and the reference line from circuit RF5 (which is characteristic of the voltage reached at normal motor operation) a command signal outputted via diode D5 and resistor R5. This channel is used for a soft start of the motor (operated manually with a pushbutton (PB) or by a computer).

The various channels CH1-CH5 will under specific circumstances take their priority. The order of priority is determined by the values of the resistors R1-R5 and the gains of the operational amplifiers OA1-OA5. The strongest priority belongs to channel CH1, which is to reduce the voltage upon excessive current through the current limit function of OA1. Once the current has been reduced to an acceptable level, for instance 120%, channel CH1 no longer intervenes. For a soft start from idle, channel CH5 establishes a ramp-up condition for the motor voltage which is pursued unless tripping by channel CH6 prevails, until the normal operative condition has been reached (end of soft start), or unless channel CH2 intervenes for stability under slip sensed condition detected. Similarly, for a soft stop by actuating push-button PB on the ramp-down circuit, the operator causes channel CH4 to operate with its ramp. Still, channel CH1 might override it and even channel CH3 might intervene. In addition, channel CH6 might at any time call for an overall tripping.

The output line OL1 from junction J1 and resistors R1, R2, R3 and R4 goes to the inverting input of an operational amplifier OA8, whereas output line OL2 from resistor R5 in channel CH5 goes to the non-inverting input of operational amplifier OA8.

A double pole filter DPF is connected across the inverting input and the output of operational amplifier OA8. It includes three parallel paths: (1) a series network of a resistor and a capacitor, (2) a capacitor and (3) a resistor. This filter is used to provide stability of operation.

Thus, in each channel (CH1, ... ,or CH5) the comparator (OA1 ... or A5) responds to a critical event occurring during the starting procedure. The critical event is detected whenever the feedback signal (FB1 .. . , or FB5) exceeds the threshold determined by the level of the reference signal (from RF1, ... , or RF5). When this occurs, the operational amplifier provides on the output line (OL1, or OL2) a signal which is translated as a control signal at the output of OA8 (line OL3).

Figure 2A:
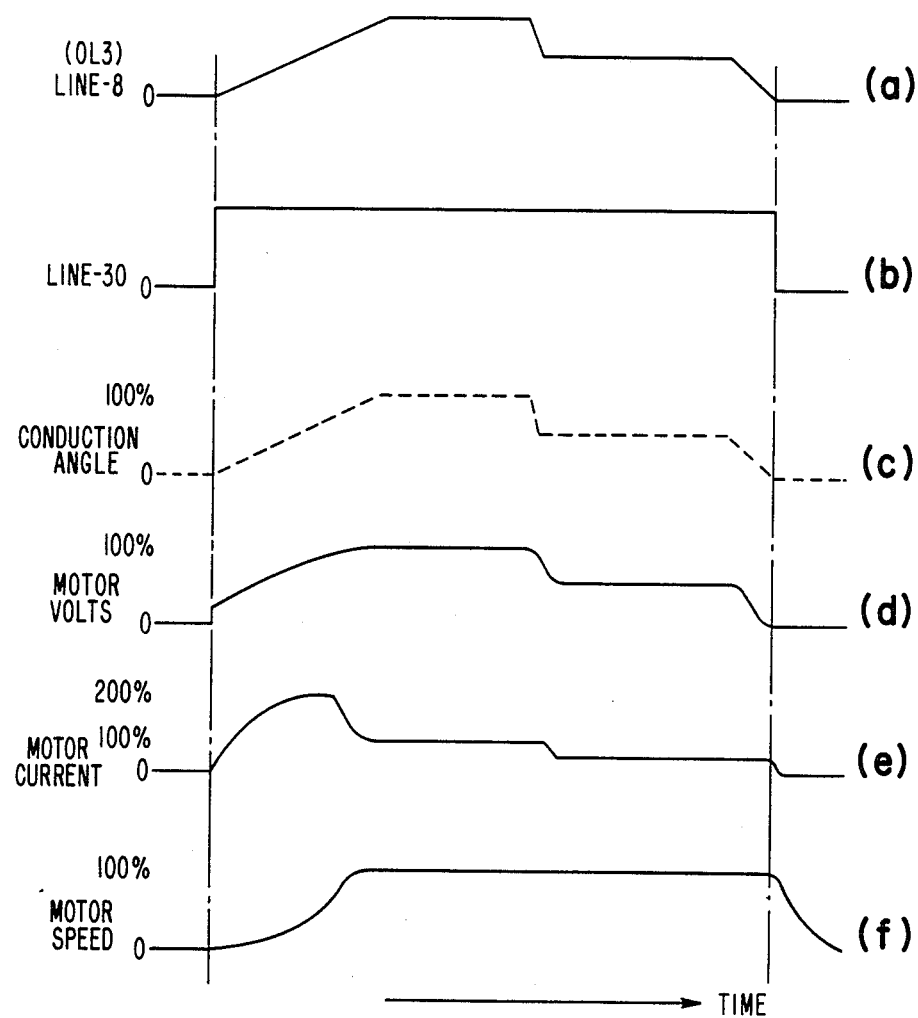
FIG. 2A and 2B are graphs illustrating the occurrence of signals at the single output of the multi-channel input section.

FIG. 2A illustrates the occurrence of signals on line 8 according to channels CH1-CH5.

It is observed here, for the sake of generalization, that the induction motor may operate in a more general way than under a constant voltage AC power supply as shown in FIG. 1. Accordingly, where FIG. 2 shows a motor control system circuit MCS which, as generally known, provides a control signal Vc at the output thereof on line OL4, such control signal Vc may be establishing definite conditions of operation for the motor in terms of speed, torque and/or voltage which would affect the gating of the SCR's (which in such case could belong to either the converter and/or the inverter if the motor were supplied via a DC link, rather than as shown in FIG. 1). However, it is assumed here that, the motor is operated under constant AC voltage. Pending normal operation, the motor is under the starting procedure as determined from line OL3 by signal Vs concurrently with a voltage Vc from line OL4 which, for instance, is a feedback signal derived from a tachometer. The operation is under the reduced-voltage starting method, i.e. the voltage applied to the motor is reduced during such procedure. Accordingly, signal $V_S$ is subtracted from the input on line OL4. Such subtraction is effected by summer S1 which has its output connected to line 8 as a common input for the processing section of FIG. 3.

A sixth channel CH6 is provided having a reference RF6, a feedback signal characteristic of a critical current level CCL and a function generator TS representing the inverse time delay for tripping namely a delay which inversely depends upon the magnitude of the excess current detected. An operational amplifier OA6 is provided associated with the inverse time function consisting in a parallel network of a capacitor and a resistor connected across the inverting input and the output of operational amplifier OA. On the output line OL6 the signal is compared by another operational amplifier OA7 with a level reference signal derived from block RF7. When the voltage on the non-inverting input from line OL6 exceeds the set point level assigned from RF7 to the inverting input, operational amplifier OA7 has its output going from a ZERO to a ONE.

Tripping is an emergency measure intended to completely disconnect and interrupt the operation. It has been introduced in motor control from the current practice in the switch breaker field. Tripping is shown in FIG. 1, as disclosed in U.S. Pat. No. 4,384,243, applied as a protective measure in a motor controller. Tripping, there, can be effected instantaneously upon the occurrence of an abnormal motor current (for example when the current reaches 600% of normal operating current) once the predetermined threshold has been exceeded. A rapid interruption of the operation of the motor under circuit 36' is caused to occur upon control of the 6-SCR trigger circuit 40' (FIG. 1). For a lesser critical level of the motor current (for example 150% of the normal operating current) U.S. Pat. No. 4,384,243 also provides for a timed trip via a start time circuit 28', whereby interruption of the SCR triggering by the 6-SCR trigger circuit 40' is delayed. The circuits 36' and 28' are much like the inverse time tripping provision of circuit TS with reference RF6 on within channel CH6 of FIG. 2.

Figure 2B:
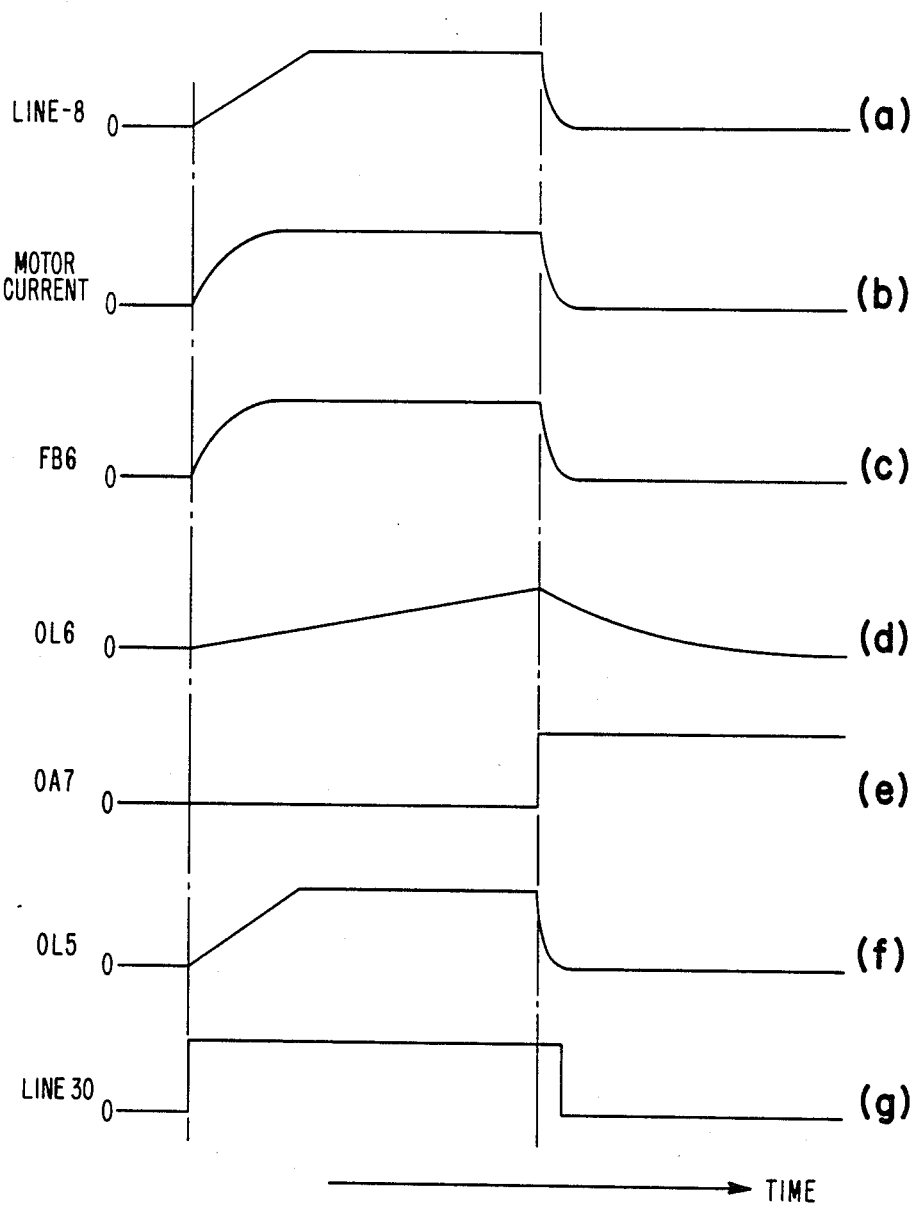

According to the present invention, the output of operational amplifier OA7 is going from low to high upon the critical threshold derived from RF7 being exceeded. This operation is combined with a time constant (C7R7) circuit interposed between output line OL7 and the base of a transistor TR7. Transistor TR7 has its two other electrodes inserted between junction J2 of the common output line 8 of the input section and ground. As a result, within a time delay defined (1) by C7R7 building up to gate transistor TR7 for conduction, and (2) by the discharging time of capacitor C7 while the voltage of line 8 is being pulled down across TR7 to ground level, the reference voltage at the common input line 8, which determines the conduction angle of the SCR's, is losing its commanding voltage. At the same time, by line OL8, the input into the non-inverting input of an operational amplifier OA9 is lowered to a level below the reference level applied from low level circuit RF9 by line OL9 to the inverting input of OA9. At this time, operational amplifier OA9 outputs on line 30 a signal commanding gate pulse suppression (GPS) within the internal control logic of the LSI chip (as shown by pin 12 on FIG. 3). It appears that tripping action (see FIG. 2B) works on the operation of the 6-SCR trigger circuit 40' in three different but concurring steps:

(1) The controlling signal at the common output of channels CH1-CH5 is being pulled down, thereby collapsing the demand on the digital pulse generator from line 8;

(2) The effect from line OL5 upon line 8 is smooth in two regards: (a) by the time delay (C7R7) imposed between trip detection by OA7 and the conduction of TR7; and (b) the time imposed for capacitor C7 to discharge before line 8 can be brought to a level below the level of line OL9. This overall delay amounts typically to five, or six, cycles for the SCR devices under gating; and (3) Pulse suppression completes the choking effect upon the existing digital pulse generation under line 8. The control signal on line 30 from OA9 goes to pin 22 (FIG. 3) of the LSI which relates to the gate pulse suppression (GPS) function therein. For the purpose of disclosing the gate pulse suppression technique within the LSI device, reference is made to U.S. Pat. No. 4,028,609 of June 7, 1977 which is hereby incorporated by reference.

It is observed, here, that tripping is a necessarily brutal action required in the context of a switch breaker, for instance in order to immediately protect the equipment against the effect of a short, whereas in the context of a digital pulse generator controlling a motor such abrupt reaction is not desirable. First, the motor has its own impedance allowing it to stop by its own electrical impedance and the motor shaft is still expected to move a stop by its own inertia. Of importance here though is the fact that the SCR's should not be brutally interrupted. Therefore, the present invention resorts to soft tripping as shown under the combination of the aforestated steps #1 and 2, and to gate pulse suppression. Accordingly, the demand on line 8, under soft tripping will have yielded while gate pulse suppression will ensue to complete the task altogether within a few cycles stopping the SCR devices.

It appears that, as seen from line 8, the digital gating pulse circuit at any instant sees a control signal which translates in magnitude the existence of a critical event, one of those of the afore-mentioned several channels CH1–CH6.

These critical events characterize the steps of a motor starting, running, or stopping procedure. There is no polling necessary because, by the very nature of the process, any one such critical event will prevail at a time, or override the others according to the particular situation. Therefore, according to the present invention, the separate successive, or alternative, occurrences are translated by separate parallel channels all converging on the same control input, namely on line 8. These critical events are: an excessive current, or a current surge, in the motor (detected in channel CH1); an excessive magnitude of the slip (detected as positive or negative in channel CH2); an abnormal magnitude of the load (as sensed and detected in channel CH3); a starting procedure involving a increased voltage upon the motor (as prescribed by a ramp-up signal until a reference threshold for normal motor operation has been met in channel CH5); and a decreased voltage applied upon the motor (as prescribed by the ramp-down signal until a reference threshold indicating stoppage level has been met in channel CH4). The motor control system MCS provides on line OL4 a signal Vc (for instance derived from a tachometer) which is preferably used during the soft start progression.

FIG. 2A, described hereinafter illustrates the succession of events of the induction motor drive in operation.

The invention relates to a SCR controlled motor drive including a multi-function control system operated in relation to parallel channels the control function of which are inherent in the mode of operation of the motor drive, for controlling via a common input a digital pulse generator.

The prior art involved discrete control loops and specific control operations affected to each such loop. The present invention relies upon a central digital pulse generator unit, typically a large scale integrated (LSI) chip, which is amenable to cope with any critical situation occurring during the starting running and/or stopping procedures. The LSI chip has been described in the aforementioned cross-referenced patent application to the extent of the logic circuit involved in generating the gating pulses in accordance with ramp zones, whereby the pulses are digitally produced with a greatly improved accuracy. For example, provision has been made for 1536 counts per cycle of the line frequency, which represents 2.23 electrical degree per count. This accounts for a timing accurate to 0.23 electrical degrees as opposed to 2.0 degrees with the prior art method. A starting procedure requires prompt action in order to cope with a critical event. Therefore the LSI chip just-mentioned has such fast response as to make it particularly suitable to answer any demand for control which could be unexpectedly appearing at the common input of line 8, whatever the issuing channel.

The LSI chip has been described in the incorporated by reference Daggett patent, to the extent of the multi-zone ramp used therein. For the purpose of this description, elements of the Daggett patent LSI chip which are here essential will be recalled hereinafter. At the same time the analog to digital conversion section ANC of FIG. 3, which relates to an analog-digital interface between the input line 8 from the input section and the LSI chip per se, will be described in detail hereinafter, thereby emphasizing the existence of a dialogue from the LSI chip per se toward the common input of line 8, as performed in accordance with the present invention.

Figure 3:
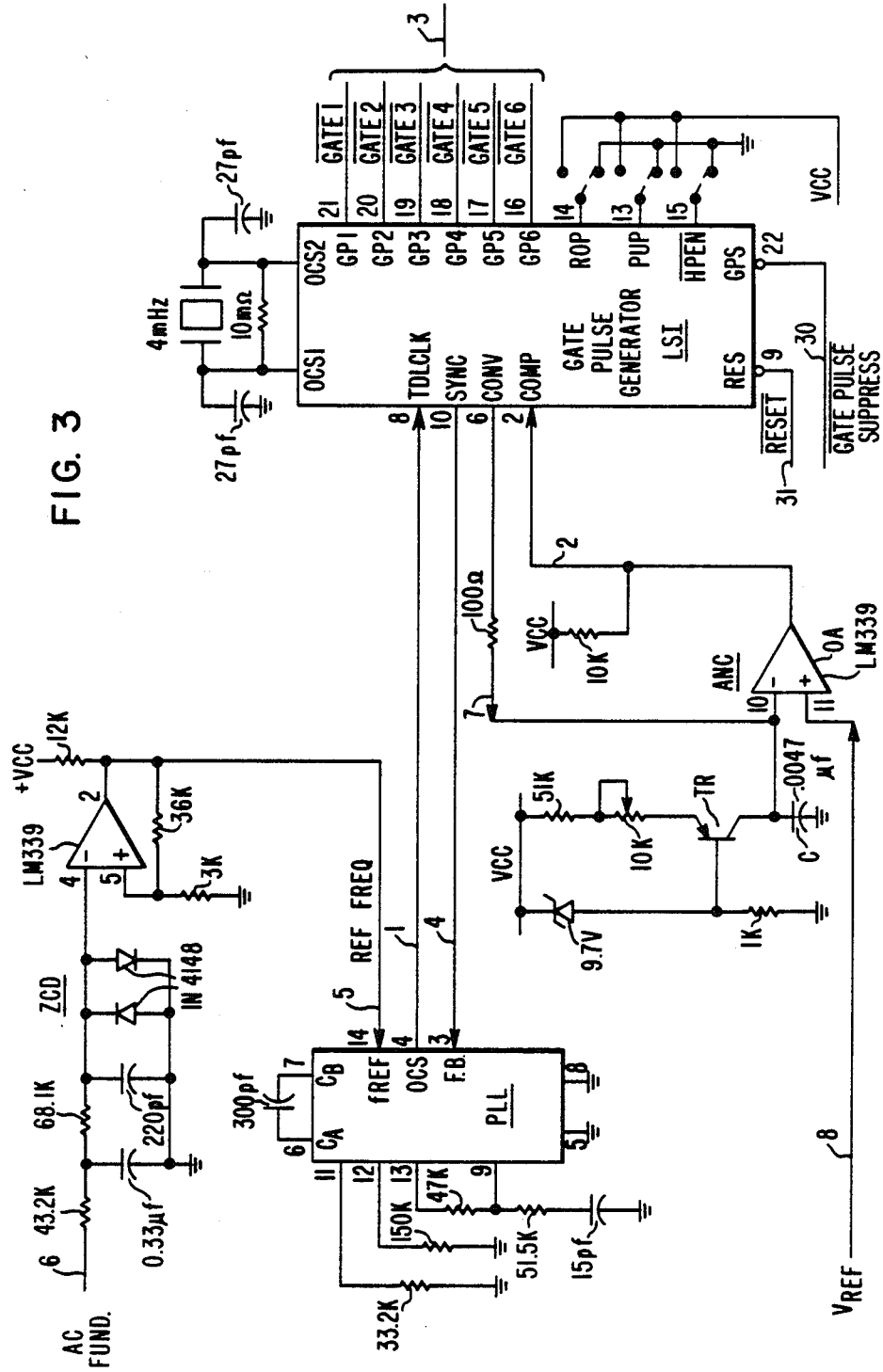
FIG. 3 illustrates in block diagram the analog circuit which is at the interface between the input section of FIG. 2 and the LSI chip of FIG. 1.

Referring to FIG. 3, the large scale integrated (LSI) circuit is shown to respond on line 1 to a phase-locked-loop circuit PLL and on line 2 to an analog circuit ANC delivering a voltage reference signal representing the desired firing angle. The LSI circuit generates on line 3 the gating pulses which command the gate pulse generator associated with the respective static power switches. As generally known, the phase-locked-loop (PLL) receives a feedback frequency signal SYNC on line 4 from the LSI, and the PLL circuit responds to a frequency signal on line 5 which is generated by the zero-crossing detector ZCD, itself responsive on line 6 to one fundamental phase of the AC lines to which the static power switches are connected for sequential conduction. The analog to digital conversion circuit ANC is responsive to a feedback signal on line 7 from the LSI circuit, while being responsive to the analog firing angle reference signal of line 8 for integration and comparator purposes.

As shown in block diagram within the dotted line LSI block, a master counter MSC responds to the pulse signal of line 1 from the phase-locked-loop PLL to generate on line 10 a "running count" representing electrical angles. From line 10 the system goes to a reference ramp multiplexer RRM which generates in digital form, on line 11, a "ramp count" which is to be matched with a firing angle, or "reference count", by the ramp-intersect method. This is achieved by a comparator CMP which responds on line 12 to the count derived from a reference ramp counter RFC in relation to the assigned value from line 2 and analog circuit ANC. When an intersection takes place between the ramp count of line 11 and the assigned reference count of line 12, a firing command is generated on line 13 by comparator CMP.

The reference ramp multiplexer RRM is responsive to the output on line 10 from the master-counter MSC and to the current state derived on line 14 from a gating state counter GST, as set by the firing command of line 13, via end-stop circuit block ESC, and line 15.

The count on the ramp represents the digital complement of the count representing the analog reference voltage which defines the firing angle at the input of the comparator. Thus, it is the count of line 12. Accordingly, the inverted digital representation of the analog control voltage of line 2 is used on line 12. When the ramp-intersect event occurs, meaning the ramp has reached the firing angle, the output of the comparator generates on line 13 a digital one-shot, and by line 16 causes a hard pulse HP to be generated on line 20. At the same time, by line 15, the gating state counter GSC is advanced. Initiation of these functions is also under control of the "End-Stop" controller ESC, to prevent excitation of firing until the ramp voltage is, typically, greater than 7.5 electrical degrees. Moreover, the End-Stop circuitry forces triggering of the hard pulse generator HPF by line 16, wherever a phase delay of 225 electrical degrees is reached in the absence of a command from the firing angle comparator CMP.

Figure 4:
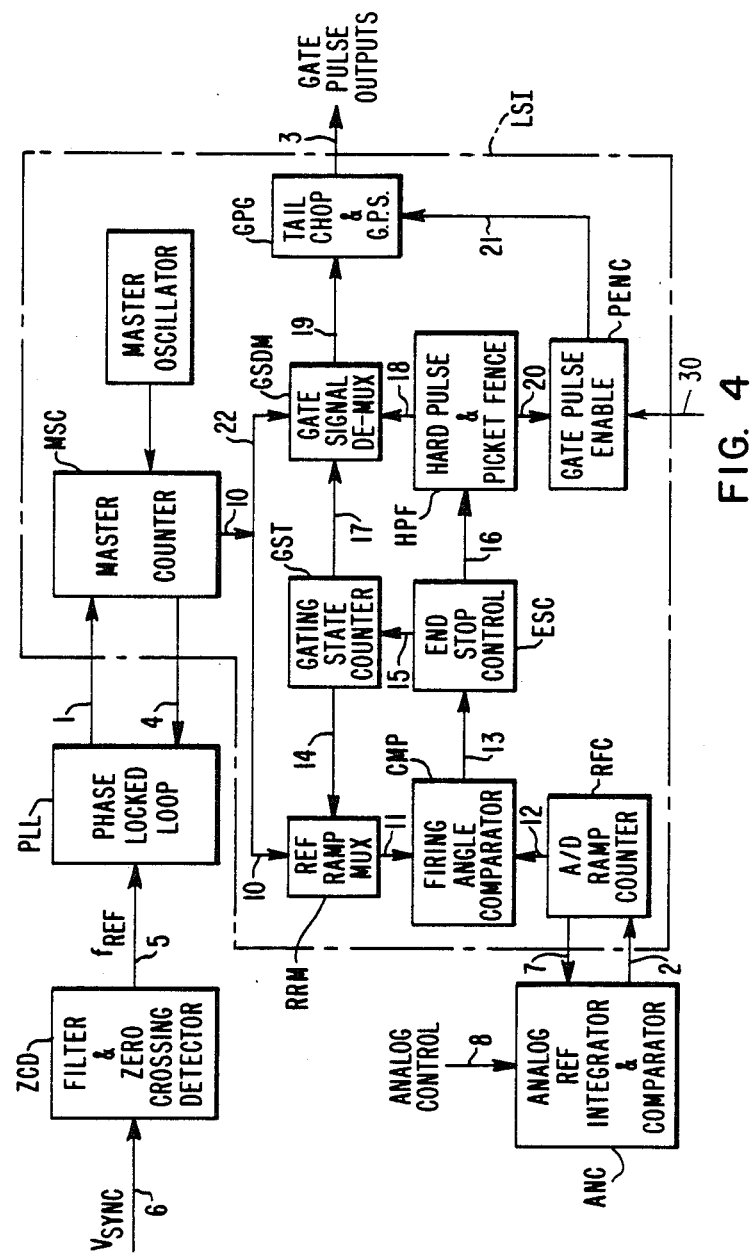
FIG. 4 is a block diagram representation of the internal organization of the LSI chip of FIG. 1.

Referring to FIG. 4, circuit implementation of the block diagram of FIG. 3 is illustrated in connection with a single chip LSI. The zero-crossing detector ZCD with the input frequency signal of line 6 feeds by line 5 into the phase-locked loop PLL. The oscillator therein (circuitry shown connected to pins 6, 7, 9, 11, 12, 13) clocks by line 1 (pin 4 of PLL) one input (pin 8) of the LSI chip (for the time delay counter TDL (a Johnson counter therein), and the solid state phase-locked-loop PLL device receives (from pin 10 of the LSI chip) a synchronizing pulse fed back by line 4 to pin 3 of the PLL.

The analog circuit ANC includes an operational amplifier OA which receives on line 8 the analog reference voltage REF assigning a specific firing angle. Capacitor C is charged through transistor TR from the associated constant current source (VCC) until the voltage impressed upon the capacitor is equal to the input control voltage of line 8. The time interval necessary for charging of the capacitor is measured within the LSI chip, in accordance with the state of pins 2 and 6 thereof. Pin 2 is used to indicate charging and discharging (from line 2 at the output of the operational amplifier) of the integrating capacitor C, whereas pin 6 of the LSI is used by line 7 to discharge capacitor C and hold it discharged, or to allow integration while charging the capacitor until there is equivalence of the integrating capacitor voltage with the input control voltage of line 8. Between those two events counter CNT within the LSI chip performs counting and provides digital conversion in relation to the magnitude of the signal of line 8, the digital reference being outputted on line 12 to comparator CMP.

The LSI chip contains circuits shown in block diagram within dotted lines in FIG. 3. It appears that the LSI chip, while fulfilling all the functions required under the present invention, requires only a minimum interface (clock from line 1, feedback on line 4, conversion on line 7, analog comparison on line 2), with the addition of gate-pulse-suppression commanded from line 30 (pin 22), and a reset function on line 31 (pin 9). The outputs for gating of the SCR power switches are on pins 16 to 21, connected to lines 3 of FIG. 3.

Holding register HR, typically is a 10-bit register loaded with a reference count derived from line 12. A ramp generator RMG, of 10-bit also, clocked by the signal of line 1 (FIG. 3), provides a ramp count which is compared with the reference count of line 12 by comparator CMP. When intersection occurs, comparator CMP sends on line 13 a command to the firing pulse generator EPG.

Equidistant digital gate pulse firing of thyristors TH1–TH6 results from the intersection of the reference REF with the various ramps at respective operative points M1–M6. For each operative point, comparator CMP generates, by lines 13, 16 and circuit HPF, a hard pulse HP followed by discrete picket-fence signals in series thereafter. As shown in FIG. 4, the hard pulse and the picket fence pulses from circuit HPF each disables a gate pulse enable circuit PENG, which otherwise when receiving the pulse suppression command of line 30 would transfer it on line 21 to the gating pulse generator EPG, as generally known. Due to the internal organization of the large scale integrated chip LSI of FIG. 3, an immediate response of the gating pulse generator GPG is achieved in response to any rapid change in the magnitude of the reference signal of line 8, above or below the level REF so as to change the conduction angle of the SCR's accordingly.

Figure 5:
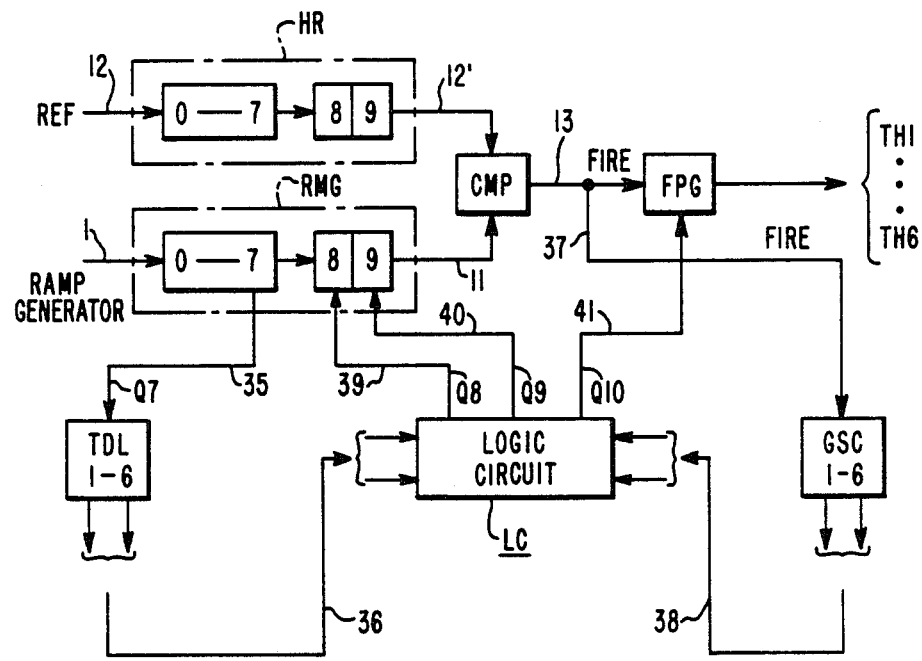
FIG. 5 shows in block diagram the ramp generator section and the logic circuit which concur in generating multi-zone ramps within the LSI chip according to U.S. Pat. No. 4,630,188 of Kenneth E. Daggett.

Referring to FIG. 5, the operation and control of comparator CMP, in relation to reference ramp multiplexer RRM and master-counter MSC, appears generally as follows:

Upon each counting to the maximum (Q0–Q7) of the 8-bit portion of ramp generator RMG, a signal Q7 is by line 35 put through to clock a time-delay counter TDL, in the form of a Johnson-counter, which outputs on logic lines 37 one combination representing one of six successive states. In other words, six successive sub-states of the main ramp of the master-counter are thereby identified on lines 36. Upon each firing command from line 13, the firing pulse generator FPG causes a corresponding thyristor TH1–TH6 to be fired in the sequence. At the same time, via line 37, the command of line 13 advances another Johnson-counter GSC providing at its output, on logic lines 38, an indication, (among six possible states of the gating state last fired in the sequence), of the gating state "next" to occur.

The output lines 36 and 38 from TDL and GSC respectively, are applied to a logic circuit LC which outputs three logic signals Q8, Q9, Q10, respectively on lines 39, 40 and 41. Signals Q8 and Q9 determine the state of the two most significant digits in the ramp generator RMG. Q10 causes firing by the gating pulse generator independently from comparator CMP and thereby advances state counter GST.

As distinguished from the Daggett patent, the present invention within the LSI chip, resides in the interaction between the analog reference integration and comparator circuit ANC of FIG. 4 and the digital treatment circuits within the LSI chip. Before considering FIGS. 6A–6D which explain how the generation of equidistant pulses with the proper phasing on the SCR's is determined by the LSI in accordance with the characteristic voltage of the input signal appearing on line 8 at a given time, circuit ANC will be considered with particularity by reference to FIG. 3. The circuit includes a source of voltage $V_{cc}$, a zener diode of 9.7 volts, and a transistor TR which together constitute a constant current source for capacitor C. In other words, when capacitor C is initially discharged it will charge under constant current, i.e. ramping or charging of capacitor C will establish a time interval (initiated at zero voltage) which corresponds to the amount of voltage reached. The charging voltage reached is determined by the magnitude of the signal from line 8 applied on pin 11 of operational amplifier OA (non-inverting input) while the positive side of the capacitor is being applied to pin 10, i.e. the inverting input thereof. The output of operational amplifier OA is a signal COMP which is a ONE or a ZERO and is applied by line 2 to pin 2 of the LSI chip. It is a ONE as long as the voltage on pin 11 is smaller than on pin 10 of OA. Therefore, the logic signal COMP thereby established becomes a Zero once the voltage on pin 11 has been exceeded and the ramping time interval of capacitor C has been terminated. Initiation of this time interval is triggered by a signal CONV appearing at pin 6 of the LSI chip and applied by line 7. As explained hereinafter, signal CONV establishes, with a FET device within the LSI chip, a ground by which line 7 short-circuits capacitor C and discharges it totally, given the necessary time. At the same time, the voltage of pin 10 has become again smaller than the voltage on pin 11 and line 2 has taken a ONE (signal COMP appears under h in FIG. 7). When line 7 is no longer grounded, ramping of capacitor C is initiated and a new time interval is being counted within the LSI. How signals CONV and COMP assume their states under control of the LSI will be explained by reference to FIGS. 6A–6D and the curves of FIG. 7.

It appears from the above, that the analog signal of line 8 has been converted into a time interval of corresponding duration, which in turn will be converted within the LSI into a digital count for use as explained by reference to FIG. 5. Moreover, such action of signal CONV will be triggered according to a pattern established within the LSI, so that the common input of line 8 can be allowed at successive instants, following completion of a digital conversion and digital treatment, to respond to a new situation expressed by a prevailing one of the several channels in parallel on the common input line 8.

The A/D conversion and digital processing of an analog output from the common input section of FIG. 2 with the assist of the analog to digital conversion section ANC of FIG. 3 under digital control of the processing section of FIG. 4, will be now considered by reference to FIGS. 3; 6A–6D and 7.

Figure 6A:
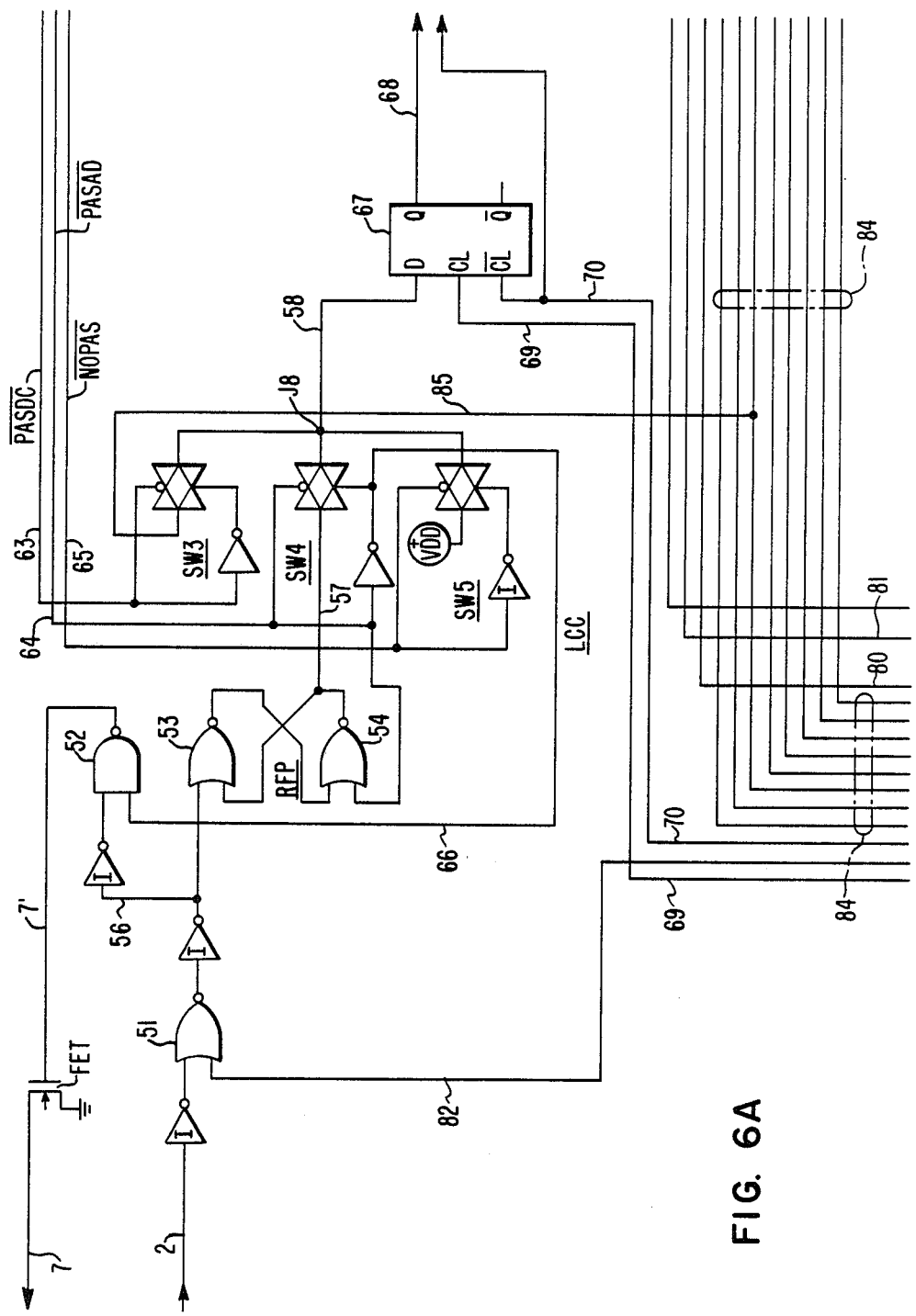
FIGS. 6A-6D illustrate the internal organization of the sequencer and circuit logic involved in the processing section within the LSI chip to perform the dialogue through the analog circuit of FIG. 3 with the input section of FIG. 2.
Figure 6B:
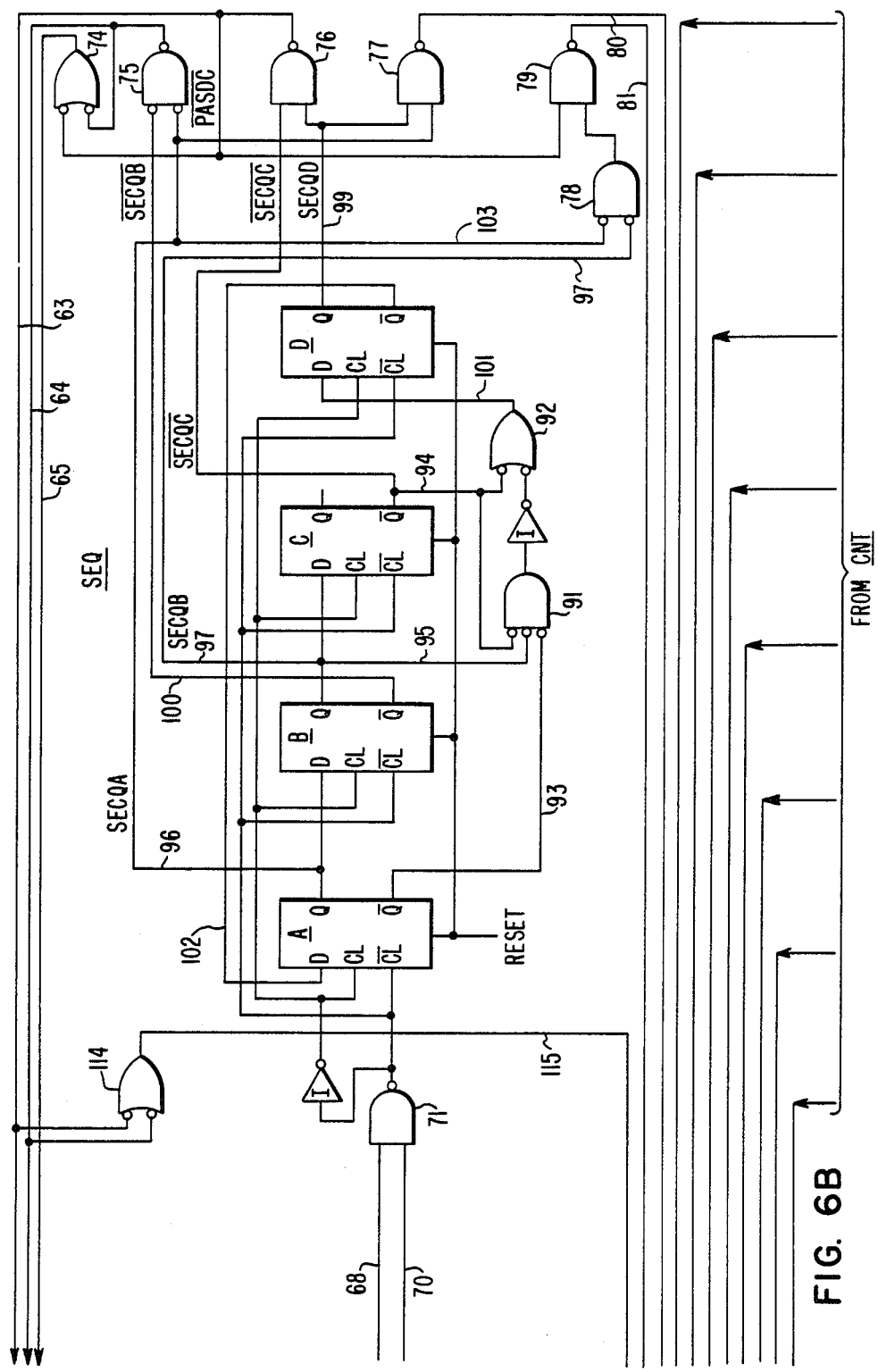

FIGS. 6A and 6B show the logic circuit LCC and the sequencer SEQ which together respond to the analog circuit ANC of FIG. 3 and control it so as to derive from time to time with the counter CNT a digital count representative of the instantaneous voltage on the common input of line 8.

Figure 7:
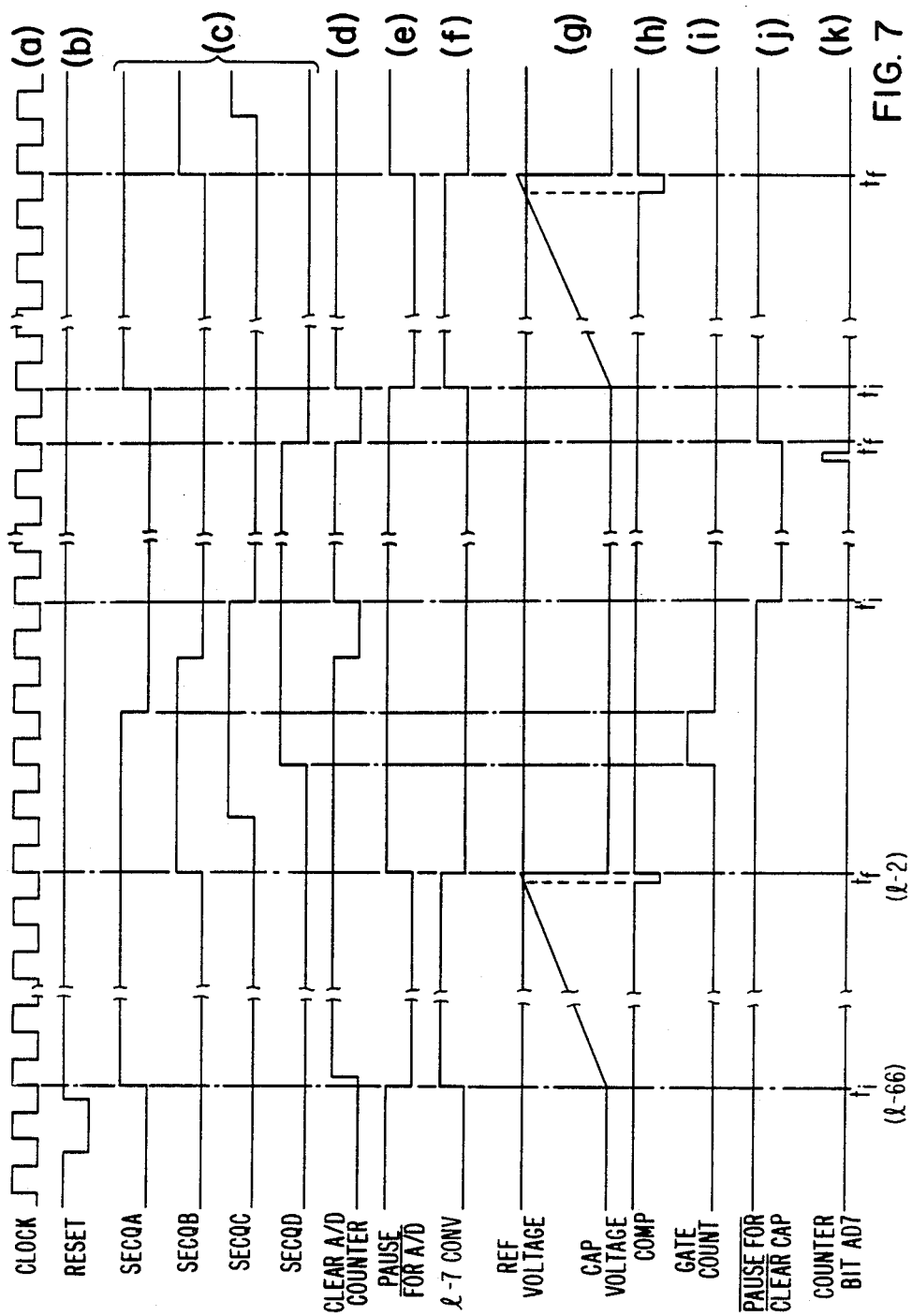
FIG. 7 illustrates with curves the operation of the circuits of FIGS. 6A-6D.

As shown on FIG. 7, sequencer SEQ, in response to a clock signal (curve (a)), assumes successive states SECQA, SECQB, SECQC, SECQD, . . . $\overline{SECQD}$, (curves (c)), after having been reset initially (curve (b)). The sequencer (FIG. 6B) is a Johnson counter including four solid state devices $\underline{A}$, $\underline{B}$, $\underline{C}$, $\underline{D}$ triggered by the clock signal to pass from one state to the next. The Q output of solid state device $\underline{A}$ appears on line 96, the Q output of $\underline{B}$ on line 97, the Q output of $\underline{D}$ on line 99, the $\overline{Q}$ output of $\underline{A}$ is on line 93, the $\overline{Q}$ output of $\overline{B}$ on line 100, the $\overline{Q}$ output of $\underline{C}$ on line 98, and the $\overline{Q}$ output of $\underline{D}$ returns by line 102 to the D input of solid state device $\overline{A}$. The Q output of $\underline{B}$ by line 95, the $\overline{Q}$ output of $\underline{A}$ by line 93 and the $\overline{Q}$ output of $\underline{C}$ by line 94 are inputted into a NAND device 91, the output of which goes, via an inverting device I, into a NOR device 92 which also receives the signal of line 94. The output from device 92 goes by line 101 to the D pin of device D. All these are conventional interconnections of a Johnson counter.

On FIG. 6A are three switches $\underline{SW3}$, $\underline{SW4}$ and $\underline{SW5}$ which, in response to respective specific combinations of the outputted sequencer states, establish the three respective situations: $\overline{PASDC}$, $\overline{PASAD}$ and $\overline{NOPAS}$ corresponding to the logic states of the respective lines 63, 64 and 65. Signal $\overline{PASDC}$ of line 63 appears at the output of AND device 76 which combines signals $\overline{SECQC}$ of line 98 and SECQD of line 99. As shown in FIG. 7 by curves (j) and (c), this situation occurs when SECQC reaches its trailing edge, while SECQD is still high. Signal $\overline{PASAD}$ of line 64, appears at the output of NAND device 75, which combines the responses of $\overline{SECQB}$ on line 100 and of SECQA on line 96. As shown in FIG. 7, this situation occurs when SECQA (curves (c)), has its leading edge while SECQB is low. Signals PASAD as a gate upon SWITCH SW4 and signal PASDC as a gate upon SWITCH SW3, create a pause i.e. they stop the automatic change of state of the Johnson counter SEQ, as shown in FIG. 6A. Junction J8, by line 58, conditions solid state device 67 to respond to the clock signal from line 69, thereby to cause, by line 68 and line 70, the AND device of FIG. 6B to advance the sequencer SEQ. However when SW4, or SW3 is ON, the clock signal of line 69 is ineffective, until conditioned by the Flip-Flop (RFP), from line 57 for switch SW4, or by the command signal of line 85 for switch SW3. The resulting pauses are shown in FIG. 7 within the time intervals $(t_i, t_f)$ and $(t_i', t_f')$ of the respective signals PASAD and PASDC. Outside those two intervals, decoding of the outputs of the sequencer SEQ leads to the signal NOPAS of line 65 which is a "No-Pause" situation. In that case, switch SW5 is gated by signal NOPAS and it applies voltage source +VDD to the junction J8, whereby control under the clock signal of line 69 becomes automatic. Therefore, the sequencer changes states automatically, as shown by the curves of FIG. 7 (curves c), outside time intervals $(t_i, t_f)$ and $(t_i', t_f')$. During the first of these two "pause" intervals, capacitor C of the analog ramp-integrator circuit ANC of FIG. 4 is being charged and A/D conversion occurs for counter CNT.

Consideration will be given now to the two "pause" time intervals PASAD and PASDC. Before the signal of line 2 has become a Zero, and after it has ceased to be, there is a ONE on line 2, (via devices 51 and 52, and line 7′). This causes by line 7′ the device FET to be conducting, thereby grounding line 7 to capacitor C of the analog comparator ANC (FIG. 3). When capacitor C is short-circuited by device FET (controlled from line 7′ in FIG. 6A), it is discharged. AT time $t_i$ when signal SECQA goes to its leading edge, switch SW4 is switched ON by the signal of line 64. Therefore, switch SW5 is Off and no longer applies at junction J8 the signal which by line 58 would let the clock of line 69 trigger the sequencer to an automatic change of stage. Also, by line 66 and device 52, line 7′ is caused to interrupt the FET device and line 7 is no longer grounded. The sequencer is on "pause" until the signal of line 2 allows, through the flip-flop RFP, line 58 to trigger the sequencer further. From instant $t_i$, line 7 not being grounded, capacitor C is charging and operational amplifier OA is allowed to act as a comparator. It has on its pin 10 a voltage which increases progressively under the constant current source charging capacitor C. Ramping goes on until the voltage on pin 10 reaches and exceeds the voltage on pin 11 as applied from the common reference line 8. When this last stage is reached, line 2 goes from a Zero to a ONE. This is translated in two respects. First, line 2 leads to devices 51 and 52 and line 7′ to make the FET device conductive and by line 7 capacitor C is again discharged. Secondly, by line 55, flip-flop $\underline{RFP}$ and by lines 57, 58 via switch SW4, the sequencer is triggered to the next stage which, as shown by FIG. 7, terminates the "pause" time interval PASAD and opens the NOPAS time interval causing switch SW5 to operate again. Between the two time instants $t_i$ and $t_f$, when the capacitor is charging, counter CNT is counting digitally the time that capacitor C has been charging up. As shown by curve (i) of FIG. 7, in response to the clock signal, shortly thereafter, the count of the master counter CNT is latched into the hold register HR. Digital treatment by the logic circuit of FIG. 5 and pulse generation toward the SCR's are accomplished thereafter, according to the teachings of the afore-mentioned K. E. Daggett.

As shown by curve (d) of FIG. 7, the count totalized into counter CNT is twice cleared for further use. This is done first following A/D conversion during time interval ($t_i$, $t_f$) after latching into the holding register HR (curve i) and before the occurrence of the PASDC time interval ($t_i'$, $t_f'$). It is done again after such time interval PASDC ($t_i'$, $t_f'$). It is observed here, that the scale of the curves of FIG. 7 does not account for the relatively long time that the A/D conversion is occurring during ramping and the relatively short time that passes between the termination of PASAD at $t_f$ for an A/D conversion operation and the initiation at $t_i$ of another A/D conversion operation. In between a "pause" PASDC is caused to occur (SECQC at instant $t_i'$ goes down. This "pause" PASDC occurs before going to the next A/D conversion period, in order to ensure that the capacitor C has been completely discharged while the FET device (following the return of COMP to a ONE) is conducting and grounding line 7. The duration of this pause is established by counting with counter CNT a fixed time interval defined from instant $t_i'$ up to when the digit AD7 appears. When this digit appears on line 85, the sequencer is moved, through switch SW5, to the next stage and pulse PASCD is terminated ($t_f'$). The second clearing of counter CNT is, then, accomplished immediately (curve d).

Figure 6C:
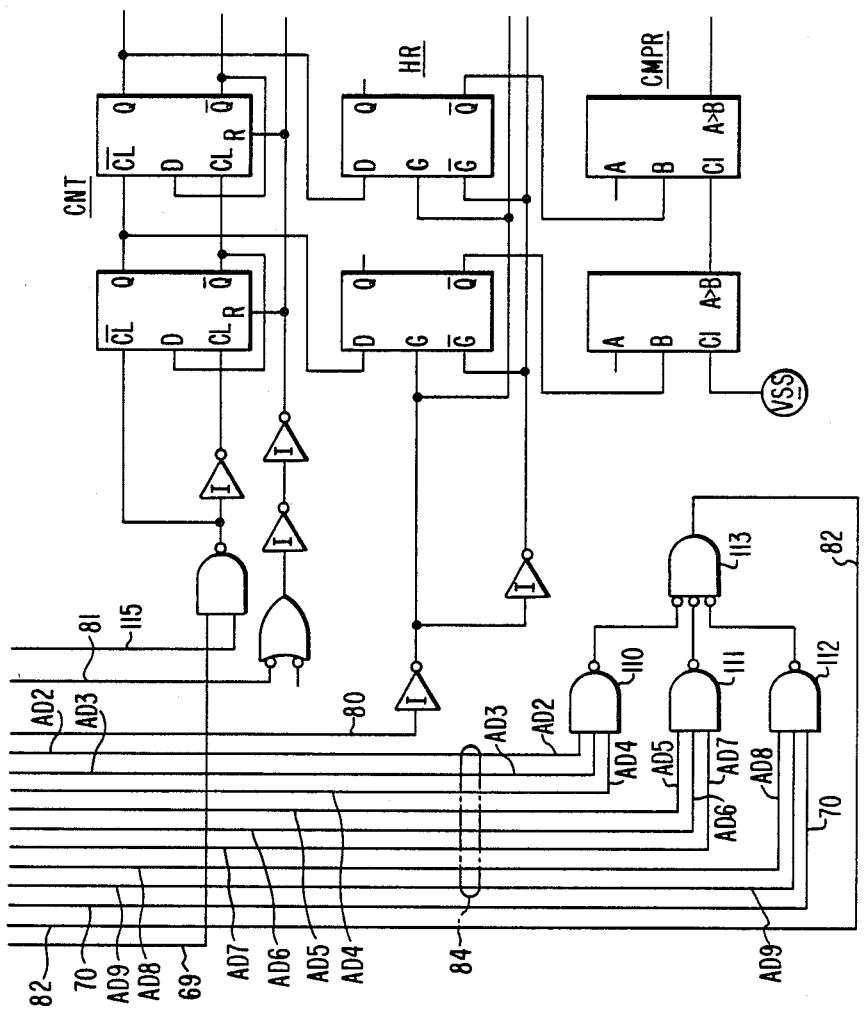
Figure 6D:
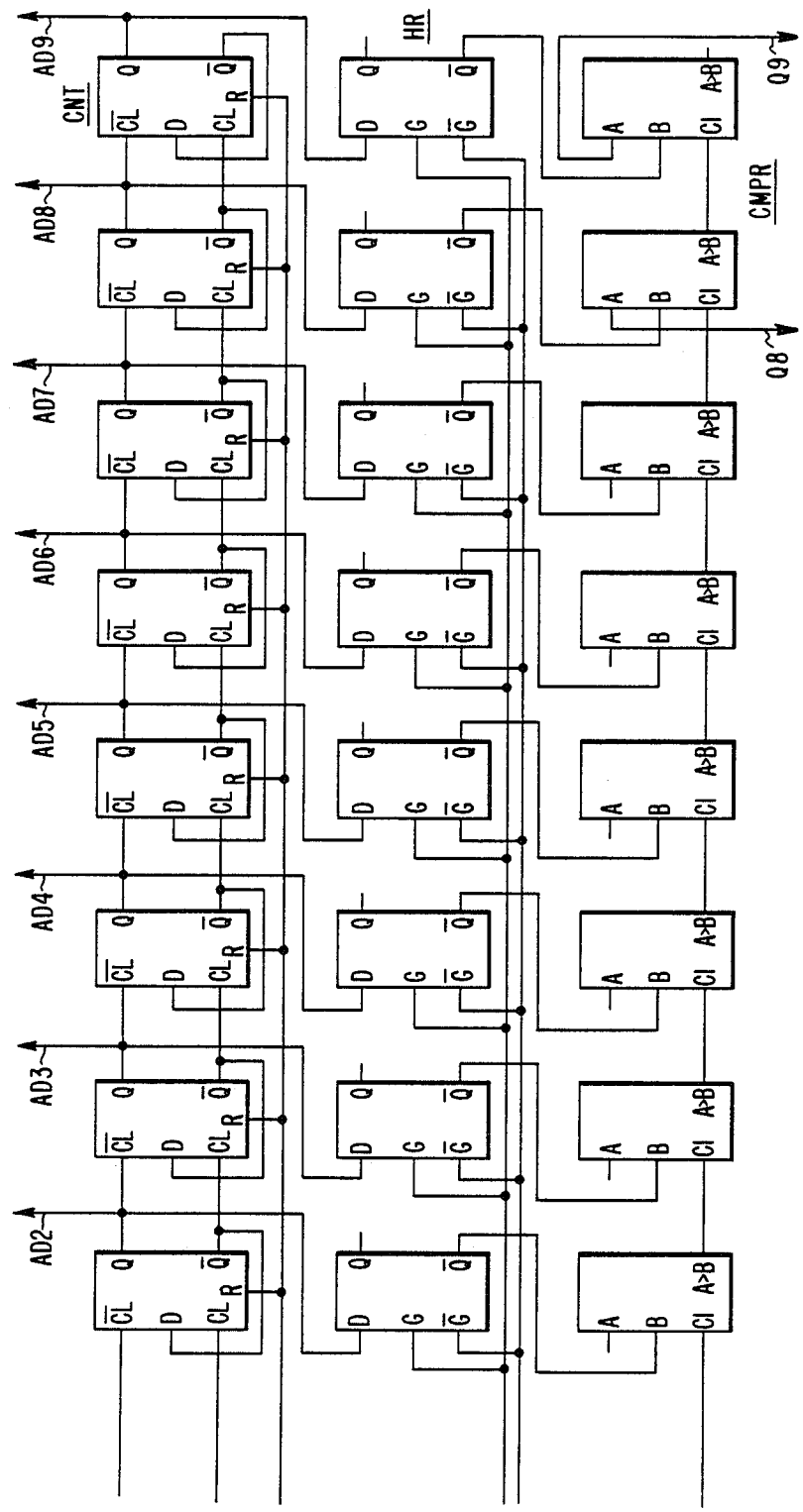

As a protective measure against a situation where the reference of line 8 could exceed always the value appearing on pin 10 of comparator OA, all the digits of counter CNT, namely AD2 to AD9, are decoded by AND devices 110, 111, 112, and 113, as shown by FIG. 6C, so that when the maximum count has been reached a logic state is reached which by line 82, device 51, line 56, device 52 and line 7' will cause the FET device to short the capacitor C and prepare for another A/D conversion or ramping step, when asked for by the sequencer SEQ (at time $t_i$).

To summarize:

I. At instant $t_i$, sequencer SEQ under the clock signal reaches its state SECQA (FIGS. 6A and 7). As a result device 75 initiates pause time interval PASAD (by line 64 and switch SW4.
  (a) first, by line 66, device 52 and line 7', the FET device ungrounds capacitor C via line 7 and ramping is initiated on pin 10 against the reference voltage of pin 11.
  (b) secondly, by device 114 and line 115 (FIG. 6B) counter CNT is gated (FIG. 6C).

Comparator OA holds a ONE on line 2 until the ramping input of pin 10 exceeds the voltage of pin 11.

II. At instant $t_f$ the threshold (the reference of line 8) of comparator OA is exceeded and line 2 goes to ZERO. (FIG. 7 under (h), namely signal COMP on pin 2 of the LSI (FIG. 3). Therefore:
  (a) by line 2, device 51, 53, 54, line 57, switch SW4, 38, line 58, device 67, the sequencer is triggered to its next stage (SECQB) and PASAD ends (FIG. 7 to under e), while SEQ goes to automatic by switch SW5 under NOPAS (line 65 to switch SW5).
  (b) line 2 also went via devices 51 and 52 (FIG. 6A) onto line 7', to switch the FET ON, and ground again capacitor C via line 7. The count totaled by counter CNT has ended.
  (c) when SECQD is triggered under automatic clocking of SEQ, by device 77 and line 80, the holding register HR is trigger to latch the count from counter CNT. (FIG. 7 under i).
  (d) when SECQB goes low, devices 78 and 79 cause by line 81 (FIG. 6B) to reset, or clear counter CNT (FIG. 7 under d).

Such A/D conversion from the input of line 8 to a count from the instant $t_i$ to the instant $t_f$ is repeated when state SECQA appears on the sequencer (FIG. 7 under (c) and (g)). The scale of the curves of FIG. 7 does not account for the pause existing between $t_i$ and $t_f$ during PASAD, nor for the relatively short time of automatic sequencing (NO PAUSE under NOPAS). Another digital count is accumulated from instant $t_i'$ to instant $t_f'$ which is the fixed time defined by counting until digit AD7 following the reset of the counter by line 81, and upon the initiation of PASDC when state SECQC ends (device 76 and line 63 of FIG. 6B). As earlier state, this count is a pause time interval created to allow complete discharging of capacitor C by line 7 when the FET device has been switched ON following A/D conversion from comparator OA. Another reset, or clearing, of counter CNT takes place with line 63, OR device 114 and line 115 (FIGS. 6B and 6C).

It appears that comparator AO with its output in digital form on line 2 (signal COMP), and with the grounding command from line 7 (signal CONV), allows interfacing with only two pins (2 and 6 on the LSI, FIG. 3). The current source causes ramping up to the threshold value of pin 11 of the comparator OA from instant $t_i$ commanded from line 7 to instant $t_f$ commanded from line 2.

Inside the LSI, digital treatment is accomplished between those two instants to derive a digital count processed otherwise as explained in the cross referenced copending patent application, and the LSI is internally prepared under digital steps to start another A/D conversion upon outstanding line 8.

It appears from the preceding description of the preferred embodiment of the invention that a plurality of channels CH1-CH6 are associated to a common A/D converter. It is known in the prior art to operate a single A/D converter in relation to a plurality of analog inputs selected by a multiplexer for ascertaining digitally data measured at several different remote locations. See for instance U.S. Pat. No. 3,940,759. The multi-function control system for an induction motor drive, according to the present invention differs substantially from such prior art. The control system here is integrated within a motor drive and closely interfaced with a large scale integrated (LSI) chip, without depriving the motor drive from any of the necessary control channels, treating these without predetermined specificity so that any potential situation or critical event can prevail, that it be during start-up, normal operation, or for stopping the motor drive. In addition, this is achieved with a minimum number of input pins and minimal addition of circuitry with the LSI chip, and without hardening the gate pulse generator. In addition to providing a common input for control of the centrally disposed and commanding gate pulse generator, the multi-function control system of the induction motor drive according to the present invention, has the common input coupled to a soft tripping channel which, as earlier stated, maximizes the protection required for the SCR devices being turned OFF quickly during tripping, while allowing prompt and safe tripping of the motor drive.

We claim:

1. In an induction motor drive supplied with AC voltage for the motor through SCR devices connected in a bridge across an AC power supply and controlled by gate pulses derived from a gating circuit to establish said motor voltage, including:
   a plurality of control channels for deriving respective analog control signals for motor voltage control in accordance with a corresponding operative mode of the motor drive each control channel being responsive to a corresponding command for establishing such operative mode of the motor by applying a corresponding analog control signal for controlling said gating circuit to apply a motor voltage in accordance with such analog control signal;
   analog-to-digital conversion means having a single analog input; said analog control signals being applied to said single analog input as a common input;
   said analog-to-digital conversion means providing a digital control signal for said gating circuit to generate gate pulses upon said SCR devices in relation to the supplied AC power to provide said motor voltage; the combination of:
   switching means for grounding said common input to override said analog control signals and to reduce the motor voltage to zero by control of said gating circuit,
   an additional control channel responsive to a motor overcurrent exceeding a predetermined critical level for generating a tripping control signal for controlling said switching means; delay means being interposed between said tripping signal and said switching means to delay grounding of said common input by said switching means;
   comparator means responsive to said common input and to a predetermined low level motor voltage reference signal for controlling said gating circuit directly to effect pulse suppression thereupon.

2. The motor drive of claim 1 with said tripping signal being generated in response to the magnitude of said overcurrent and as an inverse function of time in relation to said magnitude.

3. The motor drive of claim 1 with said gating circuit including gate pulse generating means and gate pulse suppression means operating on said gate pulse generating means, said comparator means being operative to actuate said gate pulse suppression means; with said gating circuit and gate pulse suppression means being part of a large scale integrated (LSI) chip, said analog-to-digital conversion means being integrated in part within said (LSI) chip.

* * * * *